United States Patent [19]  [11] 3,929,940
Mayerhoefer et al.  [45] Dec. 30, 1975

[54] HALOGEN-CONTAINING PHOSPHORIC ACID ESTERS

[75] Inventors: Horst Mayerhoefer, Oberwil, Basel-Land; Wolfgang Mueller, Neuallschwil, Basel-Land; Urs Sollberger, Fullinsdorf, Basel-Land; Rainer Wolf, Allschwil, Basel-Land, all of Switzerland

[73] Assignee: Sandoz Ltd., (Sandoz AG), Basel, Switzerland

[22] Filed: Mar. 4, 1974

[21] Appl. No.: 447,921

[30] Foreign Application Priority Data
Mar. 9, 1973  Switzerland........................ 3513/73

[52] U.S. Cl. ............................ 260/930; 260/45.7 P
[51] Int. Cl.² ........................ C07F 9/09; C08K 5/53
[58] Field of Search ..................... 260/930

[56] References Cited
UNITED STATES PATENTS
3,707,586  12/1972  Turley.................................. 260/928
3,761,543  9/1973  Gunsher........................... 260/930 X OTHER PUBLICATIONS
Chem. Abstracts, Vol. 118, (1954), 3387g.

*Primary Examiner*—Anton H. Sutto
*Attorney, Agent, or Firm*—Gerald D. Sharkin; Richard E. Vila; Joseph J. Borovian

[57]   ABSTRACT

The present invention concerns novel phosphoric acid esters of the formula:

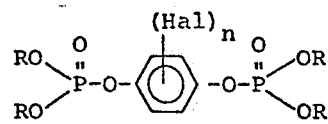

wherein
each R, is independently, a radical of formula

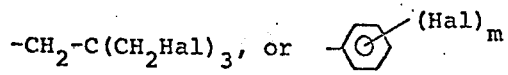

each Hal is independently, chlorine or bromine,
$n$ is O or an integer 1, 2, 3 or 4
$m$ is an integer 1, 2, 3, 4 or 5 and the molecule contains at least eight bromine atoms.

The compounds are useful flame retardants for, e.g., flammable plastics materials.

10 Claims, No Drawings

HALOGEN-CONTAINING PHOSPHORIC ACID ESTERS

The present invention relates to phosphoric acid esters possessing flame retarding properties.

Accordingly, the present invention provides compounds of formula I,

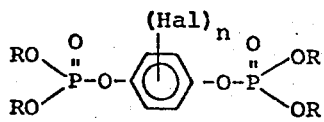
I wherein
each R, is independently, a radical of formula

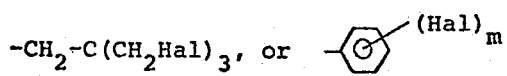

each Hal is independently, chlorine or bromine,
$n$ is 0 or an integer 1, 2, 3 or 4
$m$ is an integer 1, 2, 3, 4 or 5 and the molecule contains at least eight bromine atoms.

A preferred group of compounds are the compounds of formula Ia,

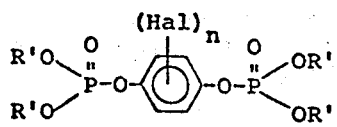
Ia wherein
each R', is independently, a radical of formula

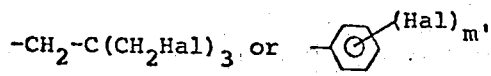

$m'$ is an integer 2, 3, 4 or 5,
Hal and $n$ are as defined above and the molecule contains at least eight bromine atoms.

A further preferred group of compounds are the compounds of formula Ib,

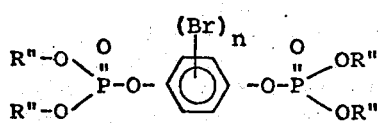
Ib wherein
each R'', is independently, a radical of formula

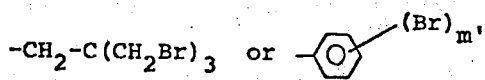

and
$n$ and $m'$ are as defined above.

A still further preferred group of compounds are the compounds of formula Ic,

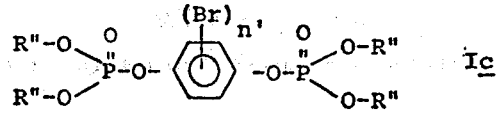
Ic wherein
$n'$ is 0 or the integer 4 and
R'' is as defined above.

Preferred significances of R are the radicals:
—CH$_2$—C(CH$_2$Cl)$_3$     —CH$_2$—C(CH$_2$Br)$_3$,

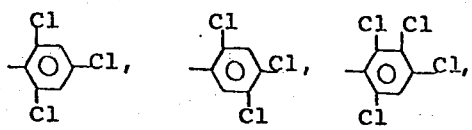

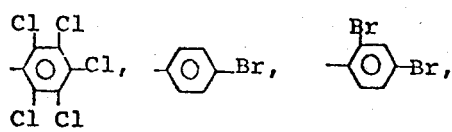

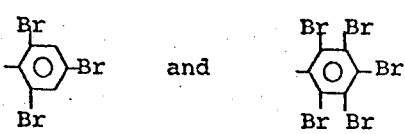

Particular preferred significances of R are —CH$_2$C(CH$_2$Br)$_3$ and tri, tetra or penta bromo substituted phenyl.

When the central phenylene nucleus is substituted by halogen, examples are as follows viz:

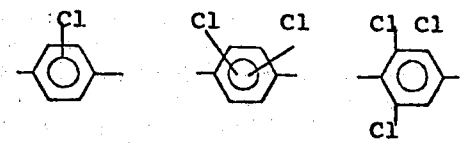

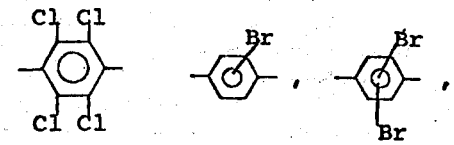

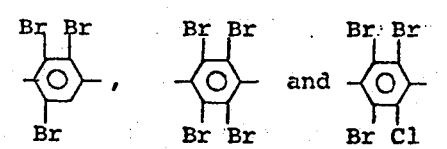

The present invention also provides a process for producing a compound of formula I, which comprises
a. condensing a compound of formula II,

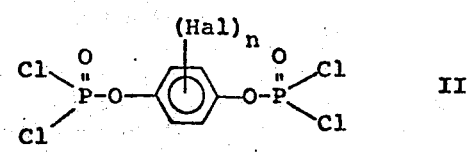
II wherein n is as defined above,
with a compound of formula III,

ROMe     III wherein Me signifies hydrogen and, when R is

R is  (Hal)$_m$ then Me is also an alkali metal ion, and
R and m are as defined above,
preferably in a molar ratio of 1 : 4 respectively, or b. condensing a compound of formula IV,

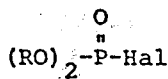
(RO)$_2$-P-Hal     IV wherein R and Hal are as defined above,
with a compound of formula V,

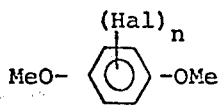
MeO- ⟨O⟩ -OMe     V
    (Hal)$_n$ wherein Me is hydrogen or an alkali metal ion and
R, Hal and n are as defined above, preferably in molar ratio of 2 : 1 respectively.

The reaction conditions of both process variants (a) and (b) are not critical. When Me signifies hydrogen, both process variants are preferably effected in the presence of an acid binding agent such as a tertiary amine, e.g. pyridine, a trialkyl amine such as triethyl amine, dialkyl anilines, or salts of strong bases and weak acids such as sodium acetate or alkali carbonates and alkali bicarbonates such as the sodium salts thereof. The reactions are suitably effected in the presence of inert organic solvents, e.g. benzene, toluene, xylene, cymol, diphenyl ether, tetrahydrofuran, dioxane, trichloro-ethylene or chlorobenzene. The reactions are preferably initiated at room temperature and concluded at between 50° and 140°C. A solvent is preferably used which boils at between 50° and 140°. When Me signifies an alkali metal ion, halogen-free solvents are preferably used at temperatures ranging from 50° to 140°, again preferably being initiated at room temperature. In the case when Me is an alkali metal, no real advantage is derived from the use of an acid binding agent.

The starting materials of formulae II, III, IV and V are known.

The compounds of formula I possess flame retardant properties and are therefore useful as flame retarding agents. To this end, the compounds of formula I may be employed in a method of flame-proofing flammable organic materials, which comprises treating the organic material with a compound of formula I.

By the term "treating" is meant either surface coating or incorporation into the body of the organic material, in manner known per se.

By the term "flame-proofing," as used herein, is meant a reduction in, and not necessarily complete elimination of, the flammability of the organic material.

The abovementioned method also forms part of the present invention.

In one embodiment of the method of the invention, the compound is uniformly distributed throughout the organic material by mechanically mixing, e.g. kneading, the compound of formula I with either a particulate, e.g. granulated, form of the organic material or alternatively with a molten form of the organic material. This embodiment is particularly suited to polymer melts, e.g. polyalkylenes and polyesters.

In a further embodiment of the method of the invention, the compound is uniformly distributed throughout a flammable polymeric organic material by incorporation of the compound at the monomer or prepolymer stage of the production of the polymer, and the polyaddition, polymerisation or poly-condensation process then effected. This further embodiment is particularly suited to certain polymeric organic materials such as polyurethanes.

After the flammable organic material has been treated in accordance with the method of the present invention, the organic material may, when appropriate, be formed into final shape, such as, by extrusion into, e.g. films, filaments, ribbons or split or textile fibres or by moulding, e.g. injection moulding.

The compounds of formula I, in general, possess notable light fastness and surprisingly high thermostability, the compounds therefore being particularly suitable for incorporation into polymer melts, e.g. for the injection moulding or extrusion, e.g. by spinning, of polypropylene or polyester at temperatures up to 300°C, such incorporation, in general, being difficult or impossible with known halogen containing phosphoric acid triesters.

The amount of the compound of formula I with which the organic material is treated in accordance with the method of the invention will, naturally, vary depending on the type of treatment, the compound employed, the nature of the organic material, the degree of flame proofing required and the required properties of the organic material so treated. However, in general, satisfactory results may be achieved when between 1 and 40 %, preferably between 2 and 10 %, especially between 3 and 6 % of the compound is employed in relation to the weight of the organic material.

Examples of flammable organic materials to which the method of the invention is applicable are polyalkylenes, e.g. polyethylene and polypropylene, polyesters, polymethyl methacrylates, polyphenylene oxides, polyurethanes, polystyrene, polyamides, e.g. nylon, polypropylene oxide, polyacrylonitrile and copolymers such as acrylonitrile-butadiene-styrene (ABS) terpolymer, acrylicester-styrene-acrylonitrile terpolymer, styrene-acrylonitrile copolymer and styrene-butadiene copolymer.

The flame retardant effect of the compounds of formula I may, in general be synergistically improved by adding a synergistic amount of antimony trioxide, particularly when R of formula I is a radical of formula —CH$_2$—C(CH$_2$Hal)$_3$ 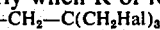

wherein Hal is as defined above, especially for the flame-proofing of polypropylene. A synergistic amount of antimony trioxide is for instance an amount between 25 and 100 % preferably 40 to 60 %, e.g. 50 %, of the amount of the compound of formula I.

Examples of the flame-proofing of a flammable organic material will now be described.

METHOD EXAMPLE 1

A compound of formula I, e.g. the compounds

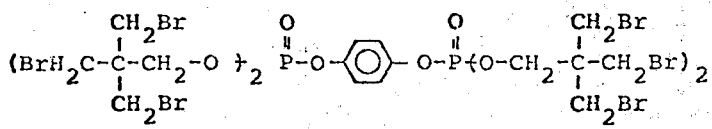

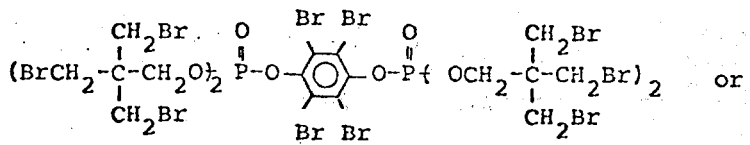

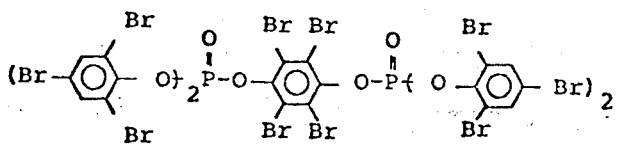

is thoroughly mixed with polypropylene powder, in the ratio of 6 to 9 : 100 parts by weight respectively, the mixture is kneaded on a three-roll mill, and is then drawn off as a hide. The resulting hide is extruded into a sheet of 1 mm thickness.

The degree of flame-proofing may be established by determining the "limiting oxygen index" [Fenimore and Martin, Modern Plastics, Vol. 44 No. 3, page 141 (1966)— ASTMD 2863 variant]. Essentially, the determination comprises supporting a specimen of the sheet vertically in a sealed chamber which is provided with an oxygen/nitrogen gas mixture inlet and also a burner for providing an open flame to which the specimen may be exposed. The oxygen content of the oxygen/nitrogen gas mixture is variable. The proportion of oxygen is varied and the amount at which no further propagation of burning of the sheet after exposure to the open flame is measured and yields the "limiting oxygen index." An index greater than the proportion of oxygen generally present in the atmosphere represents a flame proofing action.

Alternatively, the degree of flame-proofing may be determined in accordance with German flammability test DIN 53,438. Essentially, this determination comprises supporting a specimen of the sheet vertically in a chamber and exposing the sheet to a naked flame under controlled conditions, for a period of 15 seconds. After removal of the flame, the period of further burning, and the length of burnt area is determined and compared with an untreated sheet.

METHOD EXAMPLE 2

A compound of formula I, e.g., the compound of formula:

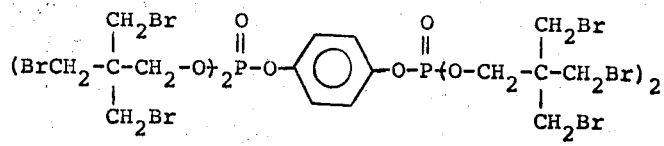

is melted with antimony trioxide in the weight ratio of 2 : 1 respectively and 4 parts of the resulting mixture is mixed with 100 parts by weight of polypropylene powder. The resulting mixture is kneaded on a three roll mill and is then drawn off as a hide. The resulting hide is extruded to a sheet of 1 mm thickness.

The degree of flame-proofing is determined in accordance with German flammability test DIN 53,438 described in Method Example 1.

Examples of the processes for producing the compounds of the invention will now be described. Temperature is referred to in °C and parts and percentages are by weight.

EXAMPLE 1

8.36 Parts of the compound of formula

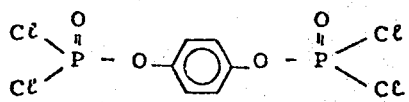

which are dissolved in 88 parts of tetrahydrofuran, are presented in an atmosphere of nitrogen. A solution of 35.1 parts of sodium-2,4,6-tribromophenolate in 166 parts of tetrahydrofuran is added dropwise with stirring at room temperature over the course of 15 minutes. The solution is then allowed to react for 20 hours. The mixture is subsequently poured into 2,500 parts of water, the precipitate is filtered off and washed with 178 parts of acetone. After recrystallization from carbon tetrachloride, the white solid is isolated. Its structure agrees with the formula

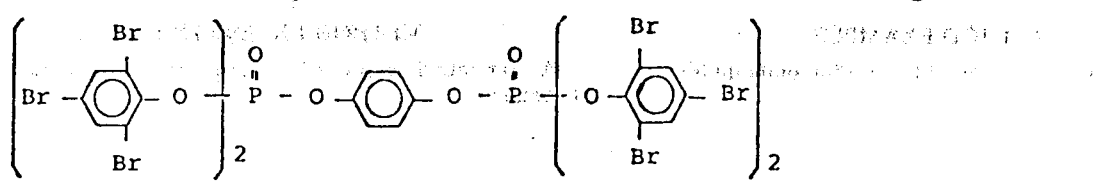

The compounds indicated in the following Table are produced in analogous manner by using the alkali phenolate or the alcohol in the presence of an appropriate acid binding agent.

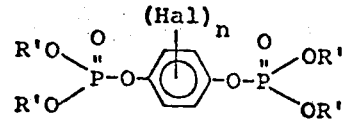

TABLE

| Example No. | Structure |
|---|---|
| 2 | 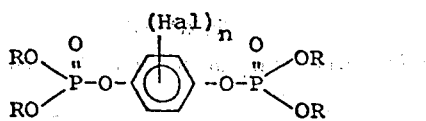 |
| 3 | |
| 4 | |

What is claimed is:
1. A compound of the formula:

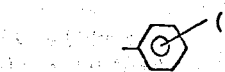

wherein
each R, is independently, a radical of formula
—CH$_2$—C(CH$_2$Hal)$_3$, or

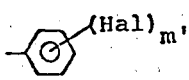

each Hal is independently, chlorine or bromine,
n is 0 or an integer 1, 2, 3 or 4
m is an integer 1, 2, 3, 4 or 5
and the molecule contains at least eight bromine atoms.

2. A compound of claim 1, of the formula:

wherein
each R', is independently, a radical of formula
—CH$_2$—C(CH$_2$Hal)$_3$ or m' is an integer 2, 3, 4 or 5,
Hal and n are as defined in claim 1 and
the molecule contains at least eight bromine atoms.

3. A compound of claim 1, of the formula:

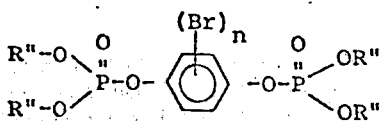

wherein
each R'', is independently, a radical of formula
—CH$_2$—C(CH$_2$Br)$_3$ or

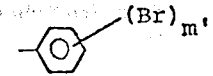

and $n$ and $m'$ are as defined in claim 2.

4. A compound of claim 1, of the formula:

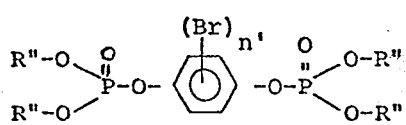

wherein
$n'$ is 0 or the integer 4 and
$R''$ is as defined in claim 3.

5. A compound of claim 1, wherein each R is independently selected from:

—CH$_2$—C(CH$_2$Cl)$_3$,    —CH$_2$—C(CH$_2$Br)$_3$,

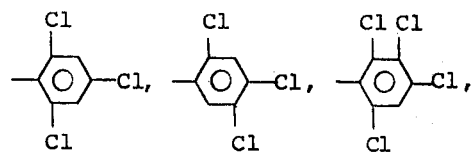

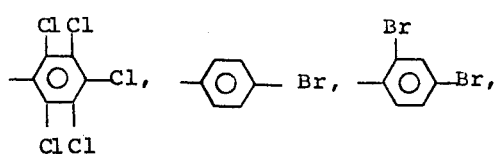

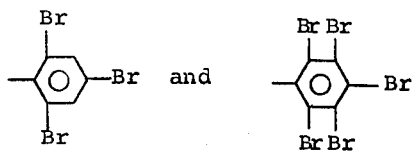

6. A compound of claim 1, wherein the central phenylene nucleus thereof is selected from:

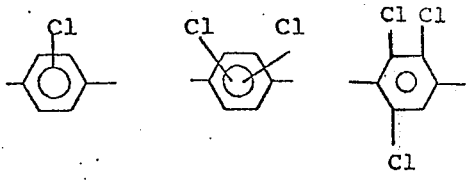

7. A compound of claim 1, of the formula:

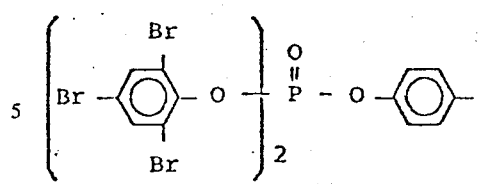

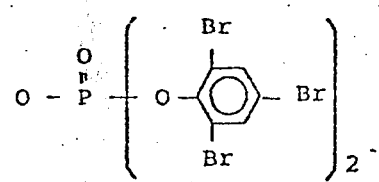

8. A compound of claim 1, of the formula:

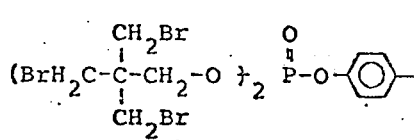

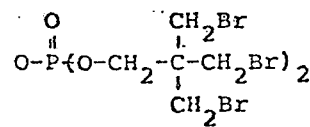

9. A compound of claim 1, of the formula:

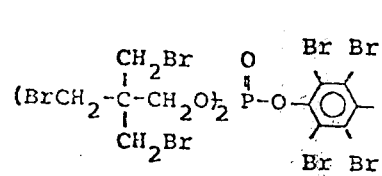

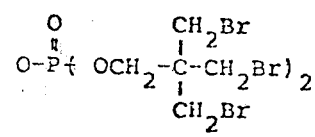

10. A compound of claim 1, of the formula:

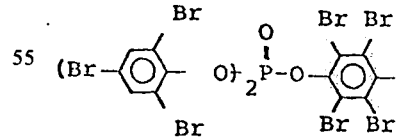

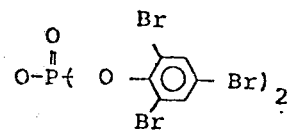

* * * * *